United States Patent

[11] 3,619,160

| [72] | Inventors | James E. Gabrielson<br>Mundelain, Ill.;<br>Leonard Berkowitz, Berkeley Heights, N.J. |
|---|---|---|
| [21] | Appl. No. | 737,595 |
| [22] | Filed | June 17, 1968 |
| [45] | Patented | Nov. 9, 1971 |
| [73] | Assignee | Esso Research and Engineering Company |

[54] PROCESS FOR GRANULATING X-O-O AND X-O-Y GRADES OF FERTILIZER
11 Claims, 1 Drawing Fig.

[52] U.S. Cl. ..................................................... 71/30,
71/59, 71/60, 71/64 DA
[51] Int. Cl. ..................................................... C05c 9/00
[50] Field of Search ........................................... 71/28, 59,
60, 61, 63, 64 DA, 64 DB, 30; 23/119

[56] References Cited
UNITED STATES PATENTS

| 2,631,084 | 3/1953 | Robinson | 71/64 |
| 2,926,079 | 2/1960 | Smith | 71/64 |
| 3,351,455 | 11/1967 | Burns | 71/63 |
| 3,464,809 | 9/1969 | Hicks | 71/63 |

Primary Examiner—Reuben Friedman
Assistant Examiner—Charles N. Hart
Attorneys—Chasan and Sinnock and J. E. Luecke ABSTRACT: X-O-O grades of fertilizer (fertilizer containing substantially only nitrogen) normally consisting essentially of diammonium sulfate and X-O-Y grades of fertilizer (fertilizer containing nitrogen and potassium) composed essentially of diammonium sulfate and potassium chloride can be effectively granulated to a desirable commercial size in the presence of a small amount (5-12 wt. percent) of a urea or ammonium nitrate additive while maintaining the temperature in the granulator of between about 150° to 210° F.

PATENTED NOV 9 1971
3,619,160
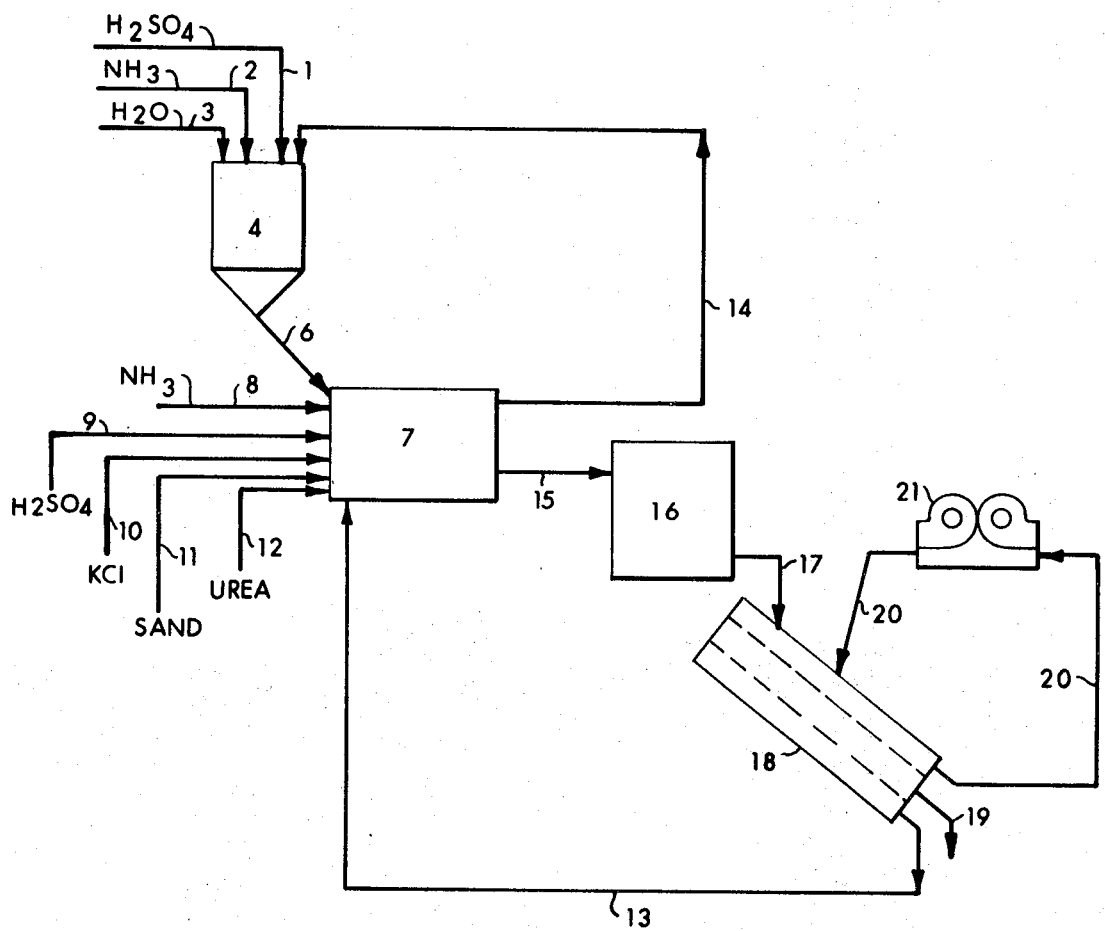
J. E. GABRIELSON
L. BERKOWITZ    Inventors
By 
Attorney

PROCESS FOR GRANULATING X-O-O AND X-O-Y GRADES OF FERTILIZER

BACKGROUND OF THE INVENTION

Variations in soil deficiencies and in the nutrient requirements of different plants as well as the variations in requirements of particular plants during different stages of their growth have led in recent years to the use of mixed fertilizers of fairly widely different compositions. Basically, mixed fertilizers consist of nitrogen, phosphorous, and potassium compounds (expressed as N-$P_2O_5$-$K_2O$ respectively in weight percent) in varying proportions. This invention is concerned with fertilizers consisting essentially of nitrogen (X-O—O grades of fertilizers and mixed fertilizers consisting essentially of nitrogen and potassium (X-O-Y grades of fertilizer). More particularly, this invention relates to a practical and economic process for effectively granulating X-O-Y grades of fertilizer wherein X ranges from 9 to 24 and more preferably from 14 to 16 wt. percent and Y varies from 9 to 40 and more preferably from 16 to 21 wt. percent by granulating a fertilizer mixture composed of diammonium sulfate and potassium chloride in the presence of an additive consisting of 5 to 12 wt. percent urea or ammonium nitrate while maintaining the temperature in the granulator of between abut 150° to 210° F.

DESCRIPTION OF THE PRIOR ART

The physical condition of mixed fertilizers has been a problem of the fertilizer industry for many years. In the past few years, the problem of manufacturing a free-flowing granular fertilizer containing granules of a relatively uniform size such that each granule contains the ingredients of the mixture in approximately the same proportion has become even more difficult. This has been due, in part at least, to an attempt to make mixed fertilizers containing a higher concentration of nitrogen, phosphorous, and potassium by using more concentrated materials. The difficulties involved in the production of a suitable and economically feasible granulated fertilizer are increased when an X-O—O or X-O-Y grade of fertilizer is desired. This is due to the fact that X-O—O and X-O-Y grades of fertilizer lack a source of phosphate which is known to have a beneficial effect upon granulation, particularly when the phosphate is made from wet-process phosphoric acid.

In particular, diammonium sulfate and potassium chloride are even more difficult to satisfactorily granulate because of their crystallinity. Conventional granulating aids such as clay, phosphate rock and iron ore increase ease of granulation only slightly. In addition, the use of these granulating aids tends to decrease the strength of the granules to a point unacceptable to the industry. Consequently, there is need of an economical process for effectively granulating X-O—O and especially X-O-Y grades of mixed fertilizers formed of diammonium sulfate [$(NH_4)_2SO_4$] and potassium chloride in order to alleviate the necessity for the separate addition to the soil of fertilizers containing a nitrogen and potassium source.

SUMMARY OF THE INVENTION

It has now been discovered that X-O—O and X-O-Y grades of fertilizer composed essentially of diammonium sulfate and potassium chloride can be effectively granulated to an economically and commercially desirable size while retaining adequate granule strength by granulating diammonium sulfate or a mixture of diammonium sulfate and potassium chloride in the presence of an additive consisting or 5–12 wt. percent urea or ammonium nitrate (weight percent based on total starting reagents wherein the reagents include potassium chloride, diammonium sulfate, sulfuric acid, and ammonia) while maintaining the temperature in the granulator between about 150° to 210° F.

A wide variety of X-O—O and X-O-Y grades of fertilizer may be granulated by this process. For example, X-O—O grades of fertilizer wherein X ranges from 22 to 24 may be granulated in accordance with the instant process in order to produce a granulated fertilizer product containing from 88 to 95 weight precent diammonium sulfate and 5 to 12 weight percent additive. Of course, lower nitrogen contents could also be made by diluting the product with an inert filler such as sand or earth. In a preferred embodiment, X-O-Y grades of fertilizer wherein X ranges from 10 to 20 and Y ranges from 9 to 30 are effectively granulated with the instant process such that the granulated fertilizer product contains from 33 to 77 weight percent diammonium sulfate, 15 to 50 weight percent potassium chloride and 5 to 12 weight percent urea or ammonium nitrate. In one embodiment of this invention, 16-0-1 6 grade of fertilizer is granulated in accordance with the instant process such that the granulated product contains about 64 wt. percent diammonium sulfate, 28 wt. percent potassium chloride and 8 wt. percent additive. In another embodiment of this invention, a 14-0-21 grade of fertilizer is effectively granulated such that the granulated fertilizer product contains about 52 wt. percent diammonium sulfate, 36 wt. percent potassium chloride and 8 wt. percent additive. Inert material such as sand or earth may be added to the final product.

The process of this invention is applicable to pugmill, pan and conventional rotating drum fertilizer granulating equipment. This invention can best be understood by examining the FIGURE which is a flow diagram for the process employed in the practice of this invention.

DESCRIPTION OF THE PREFERRED EMBODIMENTS

Sulfuric acid from a source not shown is introduced into the preneutralizer 4 by way of line 1. All of the sulfuric acid that is to be ammoniated may be added to the preneutralizer 4 or a portion, for example, 55 to 85 percent of the sulfuric acid may be added to the prenuetralizer with the remaining sulfuric acid added to the ammoniator granulator 7. Ammonia is added to the preneutralizer by way of line 2. Ammonia is added in an amount sufficient to neutralize all of the sulfuric acid to form a slurry consisting primarily of diammonium sulfate salts. Water is added by way of line 3 to give the desired slurry concentration.

The preneutralizer 4 is operated at a temperature of from about 150° to 250° F. The product slurry comprising, for example, 64 wt. percent diammonium sulfate and 36 wt. percent water is removed from the preneutralizer by way of line 6 and introduced into the ammoniator granulator 7. Alternatively, the preneutralizer may be bypassed and a diammonium sulfate-water slurry can be added directly to the ammoniator granulator by means not shown. The ammoniator granulator comprises a rotating inclined drum containing a bed of rolling discrete particles, comprising diammonium sulfate (when an X-0-0 fertilizer grade is desired) or diammonium sulfate and potassium chloride (when an X-O-Y fertilizer grade is desired) and urea or ammonium nitrate. The particle bed depth varies from ¼ to ⅔ the diameter of the drum. The drum is maintained at a slight inclination from the horizontal. The particles pass through the bed from one end of the drum to the other in a continuous curved path approximating a flattened helix of many turns, having upward inclined turns adjacent to the inner surface of the drum and downward inclined turns adjacent to the outer surface of the bed.

Ammonia may be added to the ammoniator granulator 7 by way of line 8 in an amount sufficient to neutralize all monoammonium salts in the crude diammonium salts slurry. Additional sulfuric acid may be added to the ammoniator granulator by way of line 9. In addition, it is not outside the scope of this invention to add minor amounts of phosphate (less than 6 wt. percent $P_2O_5$ which is insufficient by itself to assist granulation) in order to prepare a complete N-P-K fertilizer. Solid potassium chloride may be introduced into the ammoniator granulator by way of line 10. Up to 20 wt. percent of an inert filler such as sand or earth may also be added to the ammoniator granulator by way of line 11. Urea or ammonium nitrate is added by way of line 12 to the ammoniator granulator or, alternatively, may be added as a mixed solution with ammonia and water through line 8. Product fines (recycle) are introduced into the ammoniator granulator by way of line 13 and ammonia and water vapor driven off by the heat of reaction leave the ammoniator granulator 7 by way of line 14 and may be reintroduced to the preneutralizer 4. The flow rates for the compositions described above which result in a continuous process for the production of 16–0–16 and 14–0–21 grades of fertilizer are shown in table I and II respectively.

TABLE I

Flow Rates for the Production of a 16:0:16 Grade of Fertilizer

| | |
|---|---|
| Preneutralizer | |
| Feed, lb./ton of Product | |
|   Water | 760(1) |
|   93% $H_2SO_4$ | 562 |
|   $NH_3$ | 181 |
| Discharge, lb./ton of Product | |
|   Water Vapor | 393 |
|   Slurry | 1110 |
| Ammoniator—Granulator | |
| Feed, lb./ton of Product | |
|   Recycle | 8000 |
|   73% $H_2SO_4$ | 578 |
|   $NH_3$ | 169 |
|   Urea, Prilled | 167 |
|   KCl | 564 |
|   Slurry 64% $(NH_4)_2SO_4$ | 1100 |
| Temperature | 200° F. |

(1) can be adjusted to give desired slurry concentration.

TABLE II

Flow Rates for the Production of a 14:0:21 Grade of Fertilizer

| | |
|---|---|
| Preneutralizer | |
| Feed, lb./ton of Product | |
|   Water | 520 |
|   93% $H_2SO_4$ | 280 |
|   $NH_3$ | 90 |
| Discharge, lb./ton of Product | |
|   Water Vapor | 186 |
|   Slurry | 700 |
| Ammoniator—Granulator | |
| Feed, lb./ton of Product | |
|   Recycle | 7500 |
|   73% $H_2SO_4$ | 748 |
|   $NH_3$ | 217 |
|   Urea, Prilled | 167 |
|   KCl | 736 |
|   Slurry, 50% $(NH_4)_2SO_4$ | 700 |
|   Filler | 26 |
| Temperature | 200° F. |

Although the heat of reaction in the ammoniator-granulator will drive off much of the water in the slurry, it is desirable to pass the granules by way of line 15 into a dryer 16. The dried granules are removed from the dryer 16 by way of line 17, sized in screen drum 18 and removed by way of line 19 as the final product.

The granule size of the final fertilizer product is determined by passing the dried granulated product through a screening means consisting of two different sieve size screens having the desired sieve size openings, e.g. 6 mesh Tyler Standard sieve series and a 20 mesh Tyler screen. Accordingly, oversize particles (those granules which do not pass through the upper screen of the sizing means which has the larger of the sieve size opening of the two screens, e.g., 6 mesh Tyler screen) are recycled to the screening drum by way of line 20 after being reduced in size by the crusher 21. The undersize particles (those granules which pass through both the larger sieve openings of the upper screen and the smaller sieve opening of the smaller screen, e.g. 20 mesh Tyler screen, are removed from the screening drum by way of line 13 and recycled into the ammoniator granulator to maintain a bed of rolling particles in the granulator.

In order for the granulator to operate on a stable continuous basis at least $1/(1+R)$ of the granulated material passing through the sizing means, where R is the weight ratio of crude granulated fertilizer product recycled to the granulator to the amount of desired size granulated fertilizer product actually formed, must be of the desired granule size. For example, if the ratio of product recycled to desired granule size fertilizer product actually secured is 4:1 at least 20 percent ($1/(1+R)$) where R equals 4) of the dried fertilizer product must be of the desired granule size in order to achieve continuous operation. In the practice of the instant invention, the ratio of product recycled to desired granule size product actually produced can vary from 1:1 to 5:1 and more preferably from 2:1 to 4:1 (20 to 33 percent of the material passing through sizing means is of the desired size).

The operating conditions in accordance with the instant process for the formation of 16–0–16 and 14–0–21 grades of fertilizer having granule size such that the granules will pass through a 6 mesh Tyler screen and be retained on a 20 mesh Tyler screen as the final fertilizer product are described in tables III and IV respectively. The nominal production rate is the amount of in pounds of desired size granulated fertilizer which must be produced per hour in order for the process to operate on a stable, continuous basis ($1/(1+R)$).

TABLE III

Operating Conditions in the Production of a 16:0:16 Grade of Fertilizer

| | Run A | Run B |
|---|---|---|
| Nominal Production Rate, lb/hr. | 105 | 104 |
| Solid Feed | | |
|   wt. % KCl | 77.8 | 77.8 |
|   wt. % Urea | 22.2 | 22.2 |
| Slurry | | |
|   % $H_2O$ | 36 | 36 |
|   % $(NH_4)_2SO_4$ | 64 | 64 |
|   Temperature °F. | 190 | 185 |
| Granulator Feed Rates, lb/hr. | | |
|   Recycle | 400 | 300 |
|   Slurry | 55 | 53 |
|   73% $H_2SO_4$ | 34 | 34 |
|   $NH_3$ | 10 | 10 |
|   Solid Feed | 36 | 36 |
| Temperature—Front | 150 | 130 |
|        —Middle | 190 | 180 |
|        Back | 175 | 180 |
| Discharge Moisture, % | 4.2 | 3.8 |
| Drier, Temperature °F. | 170°–180° | 170 |
| % of water in Dried Product | 0.1 | 0.4 |
| Average lb./ton of Desired Size Material (such that the desired granule size material will pass through a 6-mesh Tyler screen and be retained on a 20-mesh Tyler screen). | 132 | 101* |

*Would have been higher except for several mechanical shutdowns during this 6-hour run.

Table IV

Operating Conditions in the Production of

A 14:0:21 Grade of Fertilizer

|  | Run A | Run B |
|---|---|---|
| Nominal Production rate, lb./hr. | 104 | 101 |
| Solid feed |  |  |
| KCl, wt. % | 75 | 75 |
| Urea, wt. % | 16.6 | 16.6 |
| Sand, wt % | 8.3 | 8.3 |
| Slurry |  |  |
| $H_2O$ % | 50 | 50 |
| $(NH_4)_2SO_4$, wt. % | 50 | 50 |
| Temperature °F. | 198 | 195 |
| Granulator Feed Rates lb./hr. |  |  |
| Recycle | 350 | 350 |
| Slurry | 35 | 35 |
| 73% $H_2SO_4$ | 39 | 37 |
| $NH_3$ | 10 | 10 |
| Solid Feed | 47 | 45 |
| Temperature, °F. |  |  |
| Front | 150 | 120 |
| Middle | 160 | 160 |
| Back | 175 | 175 |
| Discharge Moisture % | 4.5 | 4 |
| Drier Outlet Air Temp. °F. | 170 | 170 |
| % of Water in Dried Product | 0.8 | 1.0 |
| Average lb./hr. of Desired Size Material (Granules smaller than 6-mesh but larger than 20-mesh of Tyler standard sieve series) | 114 | 127 |

At these conditions, granulation exceeds the nominal rate (1/(1+R)) such that 20-25 percent of the granulated material will pass through a 6 mesh Tyler screen of the Tyler standard sieve series and be retained on a 20 mesh Tyler screen (recycle ratio of between 3 to 4:1).

A critical feature of the instant invention is maintaining the temperature in the granulator 7 at a level between about 150° to 210° F. and more preferably at about 170° to 200° F. at atmospheric pressure. The high acid rate (34 lbs./hr. of 73 percent sulfuric acid per 100 pounds of product or 680 lbs. of 73 percent sulfuric acid per ton of fertilizer produced) and the associated high ammonia rate to the granulator are necessary in order to maintain the temperature in the granulator at the desired level. Attempts to granulate a 16-0-16 grade of fertilizer in accordance with the instant process using a lesser amount of sulfuric acid, and thus a lower temperature in the granulator (140°—170° F.) resulted in the formation of only small amounts of product sized material. This material exhibited a low granule strength.

This invention will be further understood by reference to the following examples.

EXAMPLE 1

An attempt was made to granulate a 12–0–18 grade of fertilizer from diammonium sulfate, potassium chloride and sand in a pilot plant TVA-type ammoniator granulator similar to the equipment and process as described in FIG. 1. The pilot plant equipment consisted of an agitator vessel for use as the preneutralizer. A rotary drum ammoniator-granulator, a rotary drier, recycle, KCl feeders and 6-mesh and 20-mesh Tyler screens of the Tyler standard sieve series were employed. The preneutralizer was operated on a batch basis. The slurries were made by blending the appropriate amounts of water and technical grade ammonium sulfate. Steam coils were used to maintain the desired slurry temperatures.

TABLE V

Granulation of 12:0:18 Grade of Fertilizer in Pilot Plant Without a Urea or Ammonium Nitrate Additive

|  | Run 1 | Run 2 |
|---|---|---|
| Nominal Production Rate lb./hr. | 89 | 73 |
| Slurry |  |  |
| $H_2O$ % | 43 | 37 |
| $(NH_4)_2SO_4$ | 57 | 63 |
| Granulator |  |  |
| Recycle lb./hr. | 230 | 300 |
| Slurry lb./hr. | 40 | 32 |
| KCL lb./hr. | 31 | 20 |
| Sand lb./hr. | 8 | 8 |
| 73% $H_2SO_4$ lb./hr. | 24 | 24 |
| $NH_3$ lb./hr. | 8 | 6.8 |
| Temperature °F. |  |  |
| Front | 140 | 146 |
| Middle | 163 | 190 |
| Back | 162 | 163 |
| Average lb./hr. of Desired Product Size Material (6 to 20 mesh of Tyler Standard Sieve Series) | 71 | 40 |

Table V shows the results of an attempt to granulate a 12–0–18 grade of fertilizer from diammonium sulfate, potassium chloride, in the absence of a urea or $NH_4NO_3$ additive, in the above-described pilot plant granulator. In neither run 1 or run 2 as disclosed in table V did the amount of product size material (granules smaller than Tyler mesh No. 6 but larger than Tyler mesh No. 20) approach the nominal production rate. The nominal production rate for run 1 and run 2 in table V was 89 pounds of on-size material and 73 pounds of on-size material per hour respectively. Thus, the amount of product size material (71 lbs./hr. for run 1 and 40 lbs./hr. for run 2) produced by granulating diammonium sulfate and potassium chloride in the presence of sand as an inert filler did not result in a sufficient amount of the desired granule size product in order to permit the continuous granulation process unless some of the oversize or fine material were allowed to pass into the product in order to keep from accumulating recycle material.

EXAMPLE 2

Employing a pilot plant TVA ammoniator granulator as described in Example 1, table VI shows the results of granulating a 14–0–21 grade of fertilizer in the presence of an additive consisting of 8 wt. percent urea.

TABLE VI

Granulation of 14:0:21 Grade of Fertilizer in Pilot Plant in the Presence of an 8 Wt.

% Urea Additive

|  | Run 3 | Run 4 |
|---|---|---|
| Nominal Production Rate | 104 | 101 |
| Slurry |  |  |
| $H_2O$ % | 50 | 50 |
| $(NH_4)_2SO_4$ | 50 | 50 |
| Granulator |  |  |
| Recycle lb./hr. | 350 | 350 |
| Slurry lb./hr. | 35 | 35 |
| 73% $H_2SO_4$ lb./hr. | 39 | 37 |
| $NH_3$ lb./hr. | 10 | 10 |
| Sand, lb./hr | 3 | 1 |
| Urea, lb./hr. | 8 | 8 |
| Temperature °F. |  |  |
| Front | 150 | 150 |
| Middle | 160 | 160 |
| Back | 175 | 185 |

| Average lb./hr. of Product Size Material (6 to 20 mesh of Tyler Standard Sieve Series) | 112 | 126 |
|---|---|---|

As can be seen in both runs 3 and 4, the amount of desired product size material exceeded the nominal production rate. Thus, by employing urea as an additive in the granulation of diammonium sulfate and potassium chloride, sufficient granulation was obtained in order to permit a continuous granulation process such that a more uniform product was produced.

EXAMPLE 3

The granulation of 15-0-15 grade of fertilizer was studied in a laboratory TVA type ammoniator granulator in the absence of urea or ammonium nitrate additive. In the laboratory granulator, an ammoniator-granulator was operated on a batch basis. A rotary drum ammoniator-granulator 1 foot in diameter with a 1-foot long granulation section, was employed. The slurries were made by blending the appropriate amount of water and technical grade ammonium sulfate. Electric coils were used to maintain the desired granulator temperatures. The granulator was equipped with spargers by which ammonia and acid could be added to the granulator. The granulator was charged with 2000 grams of recycle material consisting of dry, fine, potassium chloride and diammonium sulfate.

TABLE VII

Granulation of 15:0:15 Grade of Fertilizer in a Laboratory of Granulator

| Total Solids, $KCl+(NH_4)_2SO_4$ | 2000 grams | 2000 | 2000 | 2000 | 2000 |
|---|---|---|---|---|---|
| Water used in slurry as % of Total Solids | 9.5 | 10 | 10.5 | 11 | 13.7 |
| 73% $H_2SO_4$ added, grams | 110 | 110 | 110 | 110 | 110 |
| % of Desired Product (6 to 20 mesh of Tyler Standard Sieve Series) | 17.9 | 18.2 | 20.2 | 27.0 | 15.5 | the data in table VII indicates, in order to obtain 27 percent product size material, 11 percent water based on the total solids employed was found to be necessary for granulation.

EXAMPLE 4

The granulation of an 15-0-15 grade of fertilizer was carried out in accordance with the procedure as described in example 3 in the presence of a 6 wt. percent urea additive.

TABLE VIII

Granulation of 15:0:15 Grade of Fertilizer in a Laboratory Granulator in the Presence of a Urea Additive

| Total Solids, $KCl+(NH_4)_2SO_4$ | 2000 g. | 2000 | 2000 | 2000 | 2000 |
|---|---|---|---|---|---|
| Wt. % of Urea added | 6 | 6 | 6 | 6 | 6 |
| Water Used, % of Total Solids | 7.2 | 7.5 | 8 | 8.5 | 9 |
| 73% $H_2SO_4$ added, g. | 83 | 110 | 110 | 110 | 110 |
| % of desired product (6-20 U.S. Sieve No.) | 29.5 | 27.5 | 27.4 | 24.4 | 19.3 |

As shown in table VIII, not only is the amount of product size material greater than that obtained in the absence of urea (example 3), but it occurs at a lower water concentration (7.2 to 8 wt. percent as compared to 11 wt. percent water based on total solids.) which facilitates drying of the granular product.

EXAMPLE 5

The procedure of example 4 was followed except that the percent of urea was varied from 2 to 10 wt. percent.

TABLE IX

Crush Strength of the Granules Produced by Granulating a 15:0:15 Grade of Fertilizer With a Urea Additive

| Total solids, $KCl+(NH_4)_2SO_4$, grams | 2,000 | 2,000 | 2,000 | 2,000 | 2,000 |
|---|---|---|---|---|---|
| Water in slurry percent of total solids | 7.4 | 7.4 | 7.2 | 8.6 | 6 |
| 73% $H_2SO_4$ added grams | 100 | 96 | 83 | 89 | 85 |
| Percent urea | 2 | 4 | 6 | 8 | 10 |
| Percent of product size (6—20 U.S. Sieve No.) | 30.7 | 36.9 | 29.5 | 32.3 | 32.2 |
| Strength of granular [1] | 0.49 | 0.67 | 0.82 | 1.11 | 1.86 |

[1] Average lbs. of pressure needed to disintegrate 10 granules which passed through a Tyler mesh 7 screen but were retained on a Tyler mesh 8 screen.

As evidenced by the data in table IX, the crush strength (lbs. of pressure needed to disintegrate a granule) increases as the percentage of urea is increased. Since crush strengths in excess of 1 pound are desired, employing from 6 to 10 wt. percent of the urea additive is preferred.

EXAMPLE 6

In accordance with the procedure described in example 3, an X-O-Y grade of fertilizer was prepared (a) in the presence of an ammonium nitrate additive and (b) in the absence of any additive.

TABLE X

Granulation of an X:O:Y Grade of Fertilizer in the Presence and in the Absence of an $NH_4NO_3$ Additive

| | a. Production of a 16:0:16 grade of fertilizer in presence of $NH_4NO_3$ | b. Production of a 15:0:15 fertilizer without $NH_4NO_3$ |
|---|---|---|
| Slurry | | |
| $(NH_4)_2SO_4$ grams | 218 | 275 |
| $H_2O$ | 128 | 190 |
| $NH_4NO_3$ grams | 44 | 0 |
| Solids in Granulator | | |
| $NH_4NO_3$ grams | 132 | |
| KCl grams | 544 | 520 |
| $(NH_4)_2SO_4$ | 960 | 1110 |
| Charged to Granulator | | |
| 73% $H_2SO_4$ grams | 103 | 75 |
| $NH_3$ grams | 35 | 35 |
| Temperature in Granulator | 210° F. | 190° F. |
| Percent of product that was of desired size (6 to 20 mesh Tyler Standard Sieve Series) | 30.9% | 17.9% |

As can be seen from the data in table X, the presence of an ammonium nitrate additive increased the amount of granulation by over 70 percent.

While the invention has been described with reference to various examples and embodiments, it will be apparent to those skilled in the art that various modificatons may be made without departing from the principles and the true nature of the invention, which is intended to be limited only by the scope of the appended claims.

We Claim:

1. A process for the continuous production of X–O–O and X–O–Y grades of fertilizer wherein X ranges from 9 to 24 and Y ranges from 9 to 40 which comprises granulating in a granulator at a temperature of from about 170°–200° F. a composition selected from the group consisting of ammonium sulfate, and ammonium sulfate and potassium chloride in the presence of from 5 to 12 weight percent, based on total starting reagents, of an additive selected from the group consisting of urea and ammonium nitrate, recovering said fertilizer from said granulator, sizing said fertilizer product to separate undersized and oversized material from the desired size product, recycling said undersized granulated product to the granulator and recycling said oversized granulated material to a crushing means and recovering as a final product at least 1/1+R of the material secured from he granulator, wherein R is the ratio of undersize granulated particles recycled to the amount of desired size product actually formed.

2. A process according to claim 1 wherein X ranges from 10 to 20 and Y ranges from 9 to 30 to produce a granulated fertilizer containing 33 to 77 weight percent $(NH_4)_2SO_4$, 15 to 50 weight percent KCL and 5 to 12 weight percent additive.

3. A process according to claim 1 wherein a R ranges from 2 to 4.

4. A process according to claim 1 for the production of X–O–Y grade fertilizer wherein X ranges from 14 to 16 and Y ranges from 16 to 21 to produce a granulated fertilizer containing from 52 to 64 weight percent $(NH_4)_2SO_4$, 28 40 36 weight percent KCL and 8 to 10 weight percent additive.

5. A process according to claim 1 for the continuous production of an X–O–O grade of fertilizer, wherein X ranges from 22 to 24 to produce a granulated fertilizer containing from 88 to 95 weight percent diammonium sulfate and 5 to 12 weight percent additive.

6. A process according to claim 4 wherein R ranges from 2 to 4.

7. A process according to claim 6 wherein from 8 to 10 weight percent urea is employed as the additive.

8. In a process for the continuous production of X–O–Y grades of granulated fertilizer wherein X ranges from 14 to 16 and Y ranges from 16 to 21 which comprises adding a slurry composed or about 34 to 50 weight percent water and 50 to 64 weight percent $(NH_4)_2SO_4$ and a solid feed composed essentially of 70 to 80 weight percent KCl into the upper end of an inclined rotating drum; therein maintaining a bed of discrete rolling particles of $(NH_4)_2SO_4$ and KCl; withdrawing said particle materials from the lower end of said drum; introducing said withdrawn material into a dryer; passing the dried material into a sizing means equipped with 6-mesh Tyler screen and a 20-mesh Tyler screen, recovering the material retained on the 20-mesh Tyler screen as the desired size granulated fertilizer product;. recycling the material which passes through the 20-mesh Tyler screen to the drum and recycling the material which does not pass through the 6-mesh Tyler screen to a crushing means and thereafter reintroducing the material into the sizing means; the improvement which comprises granulating said compositions in said drum in the presence of 5 to 12 weight percent based on total starting reagents of an additive selected from the group consisting of urea and $NH_4NO_3$ at a granulation temperature of from about 170° to 200° F. such that at least 1/1+R of the material withdrawn from the drum, where R is the ratio of undersize granulated particles recycled to the amount of desired size granulated fertilizer product actually formed is retained on the 20-mesh Tyler screen as the desired size granulated fertilizer product.

9, The process of claim 8 wherein R ranges from 2 to 4.

10. The process of claim 9 wherein the slurry is formed by ammoniating sulfuric acid having a concentration of from 90 to 95 percent $H_2SO_4$ in a preneutralizer vessel to form a slurry of a diammonium sulfate therein.

11. THe process of claim 10 wherein the additive is urea.

* * * * *